(12) United States Patent
Mathew et al.

(10) Patent No.: US 7,350,115 B2
(45) Date of Patent: Mar. 25, 2008

(54) DEVICE DIAGNOSTIC SYSTEM

(75) Inventors: Tisson K. Mathew, Hillsboro, OR (US); Sivakumar Sathappan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 10/741,816

(22) Filed: Dec. 18, 2003

(65) Prior Publication Data

US 2005/0138473 A1    Jun. 23, 2005

(51) Int. Cl.
G06F 11/00   (2006.01)

(52) U.S. Cl. .......................................... 714/46; 714/27

(58) Field of Classification Search ...................... None
See application file for complete search history.

(56) References Cited

U.S. PATENT DOCUMENTS

| | | | |
|---|---|---|---|
| 5,367,667 A | | 11/1994 | Wahlquist et al. |
| 5,586,248 A | * | 12/1996 | Alexander et al. ............ 714/22 |
| 6,393,591 B1 | | 5/2002 | Jenkins, IV et al. |
| 6,539,499 B1 | | 3/2003 | Stedman et al. |
| 6,578,158 B1 | * | 6/2003 | Deitz et al. .................... 714/11 |
| 6,956,379 B2 | * | 10/2005 | Mastoris et al. ............ 324/538 |
| 7,114,099 B2 | | 9/2006 | Bhattacharjee et al. |
| 2004/0255191 A1 | * | 12/2004 | Fox et al. ...................... 714/25 |
| 2004/0257998 A1 | * | 12/2004 | Chu et al. .................... 370/252 |
| 2005/0114474 A1 | * | 5/2005 | Anderson et al. ........... 709/220 |

OTHER PUBLICATIONS

Memory—www.pcwebopaedia.com/TERM/M/memory.html.*
Official Action dated Aug. 13, 2007 for Korean Patent Application No. 2006-7011875 with English Translation.
IBM Director 4.11: Systems Management Guide, Copyright IBM Corp. 2003, pp. 1-302.

* cited by examiner

Primary Examiner—Yolanda L Wilson
(74) Attorney, Agent, or Firm—Fish & Richardson P.C.

(57) ABSTRACT

A device management system includes a backplane, a device that communicates via the backplane and that stores identification information, a management module that receives the identification information and that provides a diagnostic module that corresponds to the identification information, and a controller associated with the device. The controller provides the identification information to the management module, receives the diagnostic module from the management module, and outputs diagnostic information for the device that is obtained via the diagnostic module.

28 Claims, 3 Drawing Sheets

DEVICE DIAGNOSTIC SYSTEM

TECHNICAL FIELD

This application relates to a device management system.

BACKGROUND

A modular slot-based computer system includes multiple devices (e.g., servers) connected to the same backplane. The system is modular in the sense that devices may be added, or removed, as desired. Such devices may be from the same manufacturer or from different manufacturers.

Because of the heterogeneous nature of modular slot-based computer systems, faults or errors that occur in a system may be difficult to diagnose. That is, because different devices may come from different manufacturers, the devices may be prone to different types and numbers of faults. Specific knowledge of each type of device is required in order to diagnose and repair faults in each device.

Typically, few individuals possess the necessary breadth of knowledge to identify and repair faults on an entire modular slot-based computing system. As a result, system faults often must go unidentified and/or unrepaired until such personnel are available to diagnose the system.

DESCRIPTION

Figure 1:
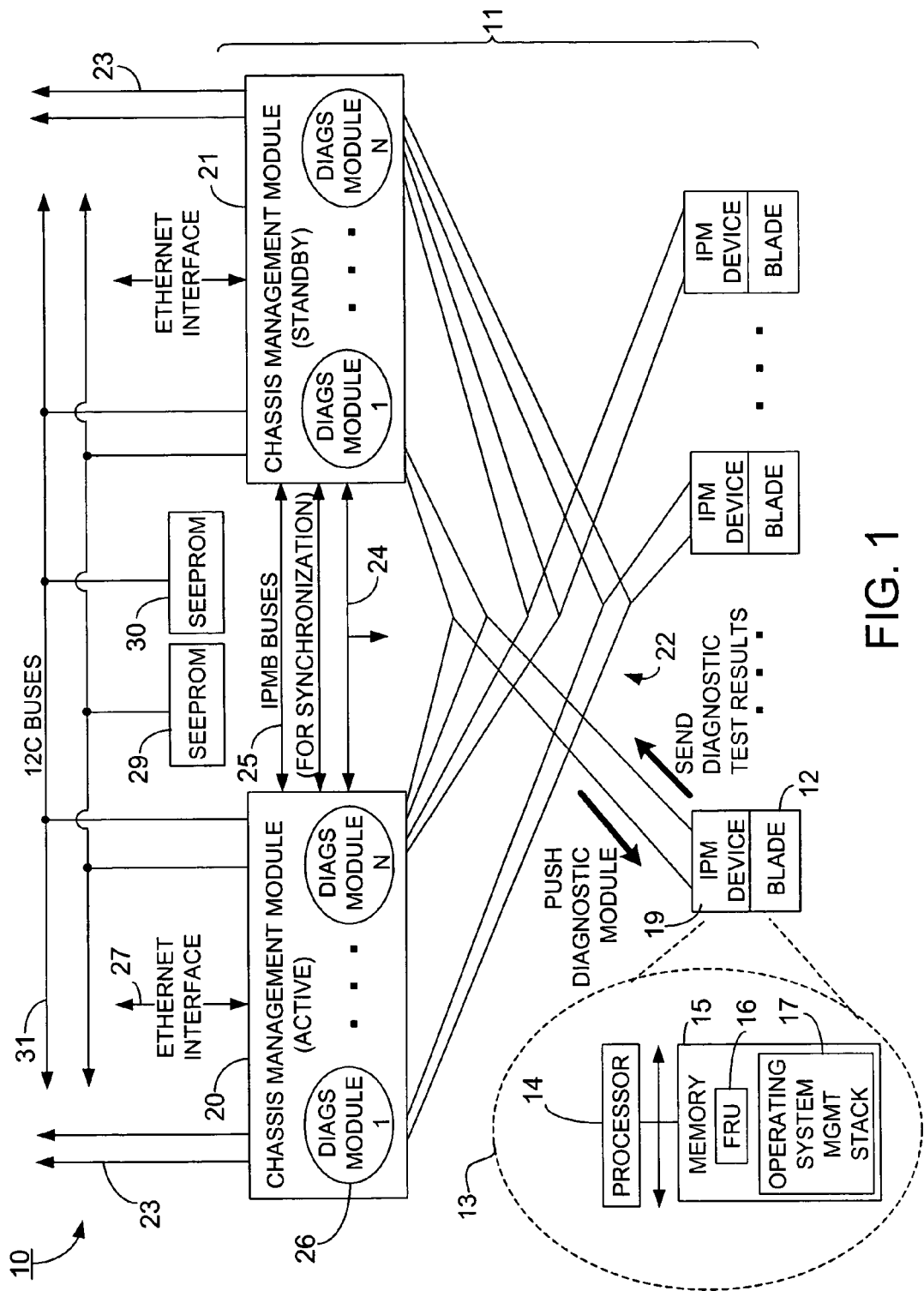
FIG. 1 is a block diagram of a modular slot-based computing system.

FIG. 1 shows a modular slot-based computer system 10, which includes a device management system 11. An example of a modular slot-based computer system is a "blade server" system. Blade server systems have a modular, multi-vendor architecture that is particularly useful for telecommunication and data-center applications. A typical blade server system includes servers that are connected to, and that communicate via, a single backplane. Other "intelligent" devices also may be connected to the backplane, including network interface cards (NICs), cooling systems, routers, and other "add-on" cards. Each intelligent device on a blade server system that communicates via the backplane is called a "blade".

In FIG. 1, each blade includes a processor and memory, as shown with respect to blade 12 (see view 13). Processor 14 may be a "high-end" processor, such as an Intel® Pentium® or Intel® Xeon® processor. Such processors are capable of executing one or more computer programs and of communicating with other devices, either via the backplane or via other means. Memory 15 includes one or more memory devices, such as read-only memory (ROM) and/or random access memory (RAM).

Included in memory 15 is a field replaceable unit (FRU) 16. FRU 16 is a memory device, or area of memory, that stores identification information for blade 12. The identification information may include, e.g., a manufacturer identifier (ID) and a part number or serial number of the device. The architecture of the blade server system is such that devices from different manufacturers may be incorporated into the system. The identity of the manufacturer thus may be part of the information used to identify a device in the system.

Also included in memory 15 is an operating system management stack 17, which may be used to run diagnostic modules, as described below. Examples of operating systems that may be run on a blade include Windows® and Linux.

Connected to each blade is a controller 19, which is known as an "Intelligent Platform Management" (IPM) device. Controller 19 may be a microcontroller or the like, such as an Intel® 8051 microcontroller. This microcontroller coordinates communications between blade 12 and chassis management modules (CMMs or simply "management modules") 20 and 21 (described below). Controller 19 communicates with the operating system on blade 12 via a System Management Software (SMS) interface (not shown). Controller 19 communicates with management modules 20 and 21 via redundant IPM buses (IPMBs) 22 on the backplane.

Management modules 20 and 21 are redundant software routines for obtaining diagnostic information obtained from the blades, and for generating a report on the diagnostic information. Management modules 20 and 21 may also control other aspects of system 10, including power, cooling, interconnects (E-keying), and event logging. They also may watch over the basic health of system 10, report anomalies, and take corrective action when needed, as described below.

One of the management modules, e.g., management module 20, operates in an active mode. In the active mode, management module 20 performs the functions described below with respect to FIG. 2, to obtain and report diagnostic information. The other management module, in this example management module 21, operates in a standby mode (while management module 20 operates in active mode). In standby mode, management module 21 does not perform the functions described below with respect to FIG. 2, but rather acts as a back-up in case management module 20 fails.

During the standby mode, management module 21 sends signals, called "pings", to management module 20. The pings may be sent over bus 24, which connects management modules 20 and 21. If management module 20 does not respond to one or more pings within a predetermined period of time, management module 21 assumes the active role and forces management module 20 into the standby role. In such cases, the formerly active management module 20 may require repair. Accordingly, the newly active management module 21 may generate and send a report advising, e.g., a network administrator, of problems with (e.g., failure of) management module 20.

Roles of the management modules (i.e., active or standby) may also be assigned by a system administrator. Control signals may be sent via buses 23, 24 to management modules 20 and 21 instructing one of the management modules to operate in standby mode and the other management module to operate in active mode. If one of the management modules has failed, the management module that is still operational may assume the active role regardless of the control signals.

Since the standby management module 21 may "take over" from the active management module 20, the two management modules are synchronized to ensure that they contain the same, up-to-date information about the blades. Synchronization is performed via IPM buses (IPMBs) 25. Synchronization may occur automatically (e.g., periodically) or in response to an external signal. Synchronization may include updating the standby management module 21 with the current diagnostic and configuration information of the active management module.

Since the management modules are redundant, the following description of management module 20 applies also to management module 21. Management module 20 contains a number of diagnostic modules 26. The diagnostic modules are software components that can run under a typical management framework, such as the Common Information Model (CIM). The diagnostic modules are heterogeneous and vendor-specific, meaning that they may not all be the same and that they may be provided by the manufacturers of the blades. This is particularly advantageous because a diagnostic module can "troubleshoot" a specific hardware device (blade) that it supports and prepare a diagnostic test report as a disk file. That is, a diagnostic module provided by a device manufacturer may be configured beforehand (e.g., by the manufacturer) to obtain diagnostic information specific to a device.

Diagnostic modules 26 obtain diagnostic information from the blades. Since the diagnostic modules are designed and provided by the blade manufacturer, each diagnostic module obtains diagnostic information that is most essential to the proper maintenance and operation of its corresponding blade. The diagnostic information may include, but is not limited to, information associated with a blade, such as error or fault data, configuration data, temperature data, moisture data, operational data, connection data, and the like. Basically, the diagnostic information can be any information relating to the status of a blade that can be monitored. The diagnostic information is particularly useful in obtaining, and reporting on, errors that occur in the blades, as described below.

Management module 20 contains a network connection 27, through which management module 20 connects to a remote network, such as the Internet. Management module 20 can obtain diagnostic module(s) from that remote network, as required. For example, management module 20 may employ Universal Description, Discovery and Integration (UDDI) to identify the Web site of a manufacturer of a particular blade. UDDI is a Web-based distributed directory that enables businesses to list themselves on the Internet and discover each other. Management module 20 may obtain the Uniform Resource Locator (URL) of a manufacturer's Web site by other means, or it may be pre-programmed with the URL.

In any case, once management module 20 accesses the Web site of a blade manufacturer, management module 20 may input, to the Web site, identification information, such as the part number of the blade. This triggers the Web site to provide the appropriate diagnostic module to management module 20, which caches the diagnostic module until it is needed. The diagnostic modules may be obtained from Web servers via the Secure Socket Layer (SSL) protocol to ensure security. The SSL protocol works by using a private key to encrypt data that is transferred over the SSL connection.

Device management system 11 also includes two Serial Electrically Erasable Programmable Read Only Memories (SEEPROMs) 29 and 30. Each of SEEPROMs 29 and 30 stores a copy of the same information (described below). This configuration ensures system redundancy. Redundant 12C buses 31 provide pathways to SEEPROMS 29 and 30.

SEEPROMs 29 and 30 store system-wide identification information, i.e., the identification information for each of the blades in the backplane, including the identity of the manufacturers, part numbers, and the like. SEEPROMs 29 and 30 may also contain one or more System Event Logs (SEL). An SEL may include a record of diagnostic information obtained from the blades over a predetermined time period. The SEL may also contain copies of reports generated and sent by the management modules and any other monitored system information.

Figure 2:
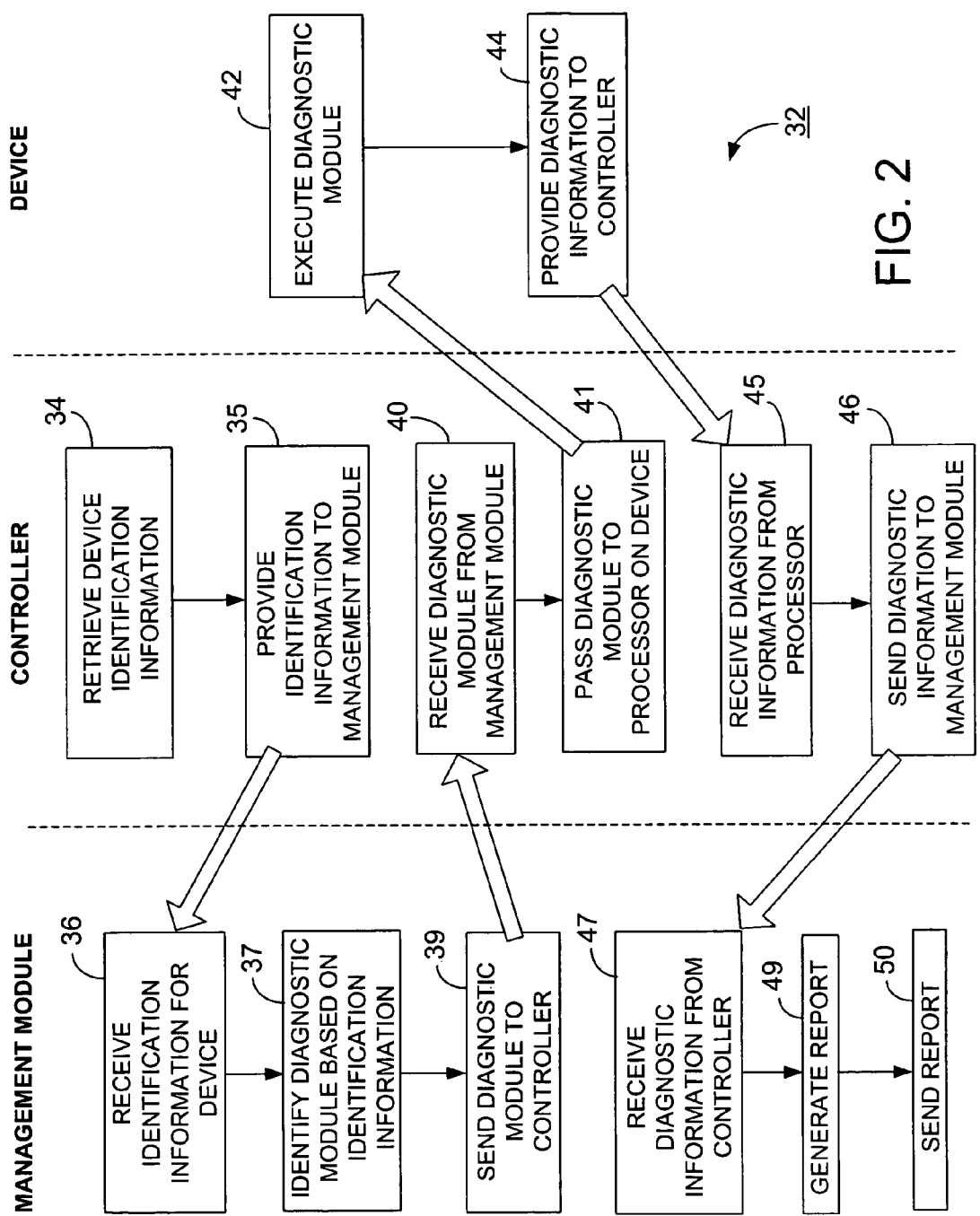
FIG. 2 is a flowchart showing processes performed by devices in the modular slot-based computing system.

FIG. 2 shows a process 32 for managing blades in system 10, which includes detecting errors in, and sending error reports for, the blades. The portion of process 32 labeled "Management Module" is performed by an active management module (e.g., management module 20); the portion of process 32 labeled "Controller" is performed by a controller (e.g., controller 19); and the portion of process 32 labeled "Blade" is performed by the processor in a blade (e.g., processor 14).

In process 32, controller 19 retrieves (34) identification information for its corresponding blade 12 from FRU 16. Controller 19 provides (35) this identification information to management module 20. The identification information may be provided automatically, e.g., when blade 12 is incorporated into system 10, or the identification information may be provided in response to a request by management module 20. Such a request may issue in response to a "troubleshoot" command provided by a system administrator.

Management module 20 receives (36) the identification information for blade 12. Management module 20 uses the identification information to identify (37) a diagnostic module that corresponds to blade 12. In one embodiment, management module 20 uses a mathematical algorithm to compute a module ID based on a manufacturer ID and a part number in the identification information. The module ID is used to retrieve the appropriate diagnostic module (which is indexed to the module ID by the management module).

The appropriate diagnostic module may be retrieved from an internal memory or from an external location, such as a Web server/site. More specifically, if management module 20 is unable to locate, on system 10, a diagnostic module that corresponds to the module ID, management module 20 may query the blade manufacturer's Web site, as described above, in order to obtain the diagnostic module. Assuming that the diagnostic module is obtainable, process 32 proceeds.

Management module 20 sends (39) (i.e., "pushes") the diagnostic module to controller 19 via IPMBs 22. Controller 19, in turn, receives (40) the diagnostic module from management module 20. Diagnostic modules may require an operating system for execution. In this case, controller 19 passes (41) the diagnostic module to processor 14 on blade 12, together with instructions to execute the diagnostic module. Processor 14 executes (42) the diagnostic module. The diagnostic module obtains diagnostic information (i.e., diagnostic test results) for blade 12. As noted, the diagnostic module is specific to blade 12 and, hence, has access to proprietary details that can be used to pinpoint problems with relatively high accuracy.

Processor 14 provides (44) the diagnostic information to controller 19. It is noted that controller 19 may be capable of running some diagnostic modules that do not need an operating system management stack. Such diagnostic modules may be specially tagged to ensure that they are run "locally" by a controller, rather than processor 14.

Controller 19 receives (45) the diagnostic information (e.g., from processor 14) and sends (46) the diagnostic information to management module 20. Management module 20, in turn, receives (47) the diagnostic information. Management module 20 generates (49) a report based on the diagnostic information. The report may be a detailed report providing all available information on the status of blade 12, including specific error-related information. Alternatively, the report may be a summary of selected status information. The report format may be specified by a command sent from the system administrator or may be programmed into management module 20.

Management module 20 may store the report in memory (e.g., SEEPROM 29) and/or output (50) the report to a system administrator, e.g., via the management module's network connection. The management module may provide the system administrator with a report automatically upon arrival of the diagnostic information or in response to a query. The system administrator may use the report to locate problems with the blade and to fix or to repair the problems offline.

Figure 3:
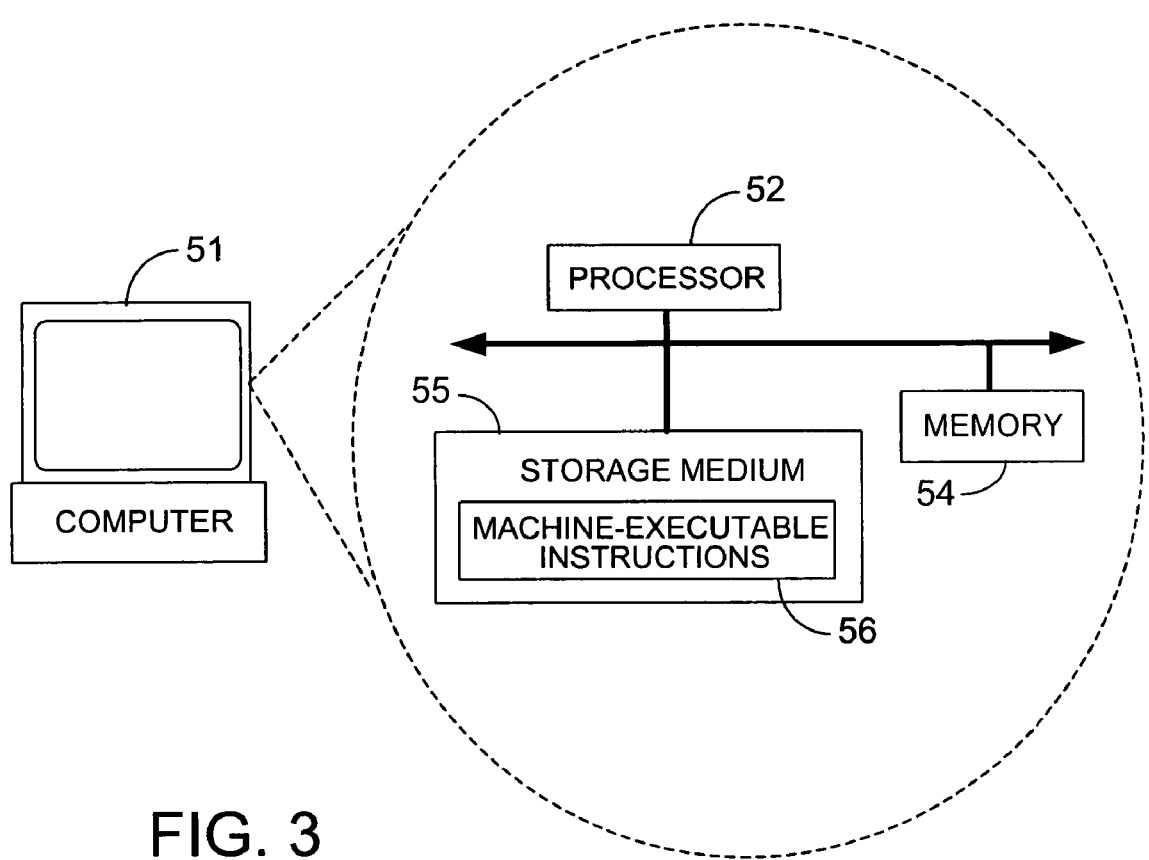
FIG. 3 is a close-up view of a computer that can be used to execute one of the processes of FIG. 2.

FIG. 3 shows a computer on which the management modules may be executed. Computer 51 includes a processor 52, a memory 54, and a storage medium 55 (e.g., a hard disk). Storage medium 55 stores machine-executable instructions 56 which are executed by processor 52 out of memory 54 to implement the functionality of management modules 20 and 21.

Management modules 20 and 21 are not limited to use with the hardware and software of FIGS. 1 and 3; they may find applicability in any computing or processing environment.

The management modules can be implemented in digital electronic circuitry, or in computer hardware, firmware, software, or in combinations of them. The management modules can be implemented as a computer program product or other article of manufacture, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The method performed by the management modules can be performed by one or more programmable processors executing a computer program to perform functions. The method performed by the management modules can also be performed by, and apparatus of the management modules can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The management modules can be implemented in a computing system that includes a back-end component, e.g., as a data server, or that includes a middleware component, e.g., an application server, or that includes a front-end component, e.g., a client computer having a graphical user interface or a Web browser through which a system administrator can interact with the management modules, or any combination of such back-end, middleware, or front-end components.

The components of the system can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The processes described herein are not limited to the specific embodiments above. For example, blocks of FIG. 2 may be re-ordered and/or omitted, as desired, to achieve the results set forth above. There may be more, or less, than two management modules per modular slot-based computing system. Additional components, not described herein, may be included in the modular slot-based computing system.

Other embodiments not described herein are also within the scope of the following claims.

What is claimed is:

1. A system comprising:
 a backplane;
 a device to communicate via the backplane, the device for storing identification information;
 a management module to receive the identification information, and to provide a diagnostic module that corresponds to the identification information; and
 a controller associated with the device, the controller to provide the identification information to the management module, to receive the diagnostic module from the management module, and to output diagnostic information for the device that is obtained via the diagnostic module;
 wherein the diagnostic module is executable on at least one of the device and the controller to obtain the diagnostic information for the device;
 wherein, if the diagnostic module requires a full operating system for execution, the controller is configured to pass the diagnostic module to the device for execution; and
 wherein, if the diagnostic module contains a tag indicating that the diagnostic module is executable on the controller, the controller is configured to execute the diagnostic module.

2. The system of claim 1, wherein the management module is configured to receive the diagnostic information from the controller and to generate a report based on the diagnostic information.

3. The system of claim 2, wherein the report comprises one of a summary of the diagnostic information and a detailed report of the diagnostic information.

4. The system of claim 1, further comprising:
a back-up module to provide redundant functionality for the management module.

5. The system of claim 4, further comprising a bus that interconnects the management module and the back-up module, the management module and the back-up module maintaining synchronization via the bus.

6. The system of claim 5, wherein the back-up module is configured to ping the management module and, if a return signal is not received from the management module in response to a ping, the back-up module is configured to assume control over functions performed by the management module.

7. The system of claim 1, wherein the management module is configured to obtain the diagnostic module using the identification information.

8. The system of claim 7, wherein the management module is configured to obtain the diagnostic module via the Internet.

9. The system of claim 1, further comprising a memory, into which the management module stores the identification information.

10. The system of claim 1, further comprising:
a second device to communicate via the backplane, the management module for providing a second diagnostic module to the second device and for receiving, from the second device, second diagnostic information that is obtained via the second diagnostic module.

11. The system of claim 1, wherein the device includes a processor to execute the diagnostic module, the controller for providing the diagnostic module to the processor, the processor for providing the diagnostic information to the controller.

12. A method of managing a device in a modular computing system, the method comprising:
receiving identification information for the device;
identifying a diagnostic module that corresponds to the device based on the identification information;
tagging the diagnostic module if the diagnostic module is executable by a controller associated with the device instead of by the device;
sending the diagnostic module to the controller associated with the device; and
receiving diagnostic information relating to the device that was generated using the diagnostic module.

13. The method of claim 12, further comprising:
generating a report based on the diagnostic information; and
outputting the report.

14. The method of claim 13, wherein the report comprises one of a summary of the diagnostic information and details associated with the diagnostic information.

15. The method of claim 12, further comprising:
obtaining the diagnostic module via a network using the identification information.

16. The method of claim 15, wherein the method is performed for each of multiple devices in the modular computing system using diagnostic modules that correspond to the multiple devices.

17. A method, performed by a controller associated with a device, of providing diagnostic information for the device to a management module in a modular computing system, the method comprising:
providing identification information to the management module;
receiving a diagnostic module from the management module;
obtaining diagnostic information for the device via the diagnostic module, wherein obtaining the diagnostic information comprises executing the diagnostic module on the controller if the diagnostic module is tagged or passing the diagnostic module to a processor on the device for execution by the processor if the diagnostic module requires a full operating system for execution; and
outputting the diagnostic information to the management module.

18. The method of claim 17, wherein obtaining comprises:
receiving the diagnostic information from the processor.

19. The method of claim 17, wherein the identification information is provided in response to a request from the management module.

20. The method of claim 17, wherein the identification information is provided automatically when the device is incorporated into the modular computing system.

21. An article comprising a machine-readable medium that stores instructions for managing a device in a modular computing system, the instructions for causing a machine to:
receive identification information for the device;
identify a diagnostic module that corresponds to the device based on the identification information;
tag the diagnostic module if the diagnostic module is executable by a controller associated with the device instead of by the device;
send the diagnostic module to the controller associated with the device; and
receive diagnostic information relating to the device that was generated using the diagnostic module.

22. The article of claim 21, further comprising instructions that cause the machine to:
generate a report based on the diagnostic information; and
output the report.

23. The article of claim 22, wherein the report comprises one of a summary of the diagnostic information and details associated with the diagnostic information.

24. The article of claim 21, further comprising instructions that cause the machine to:
obtain the diagnostic module via network using the identification information.

25. An article comprising a machine-readable medium that stores executable instructions to provide diagnostic information for a device to a management module in a modular computing system, the instructions for causing a machine to:
provide identification information to the management module;
receive a diagnostic module from the management module;
obtain diagnostic information for the device via the diagnostic module, wherein obtaining the diagnostic information comprises executing the diagnostic module on the controller if the diagnostic module is tagged or passing the diagnostic module to a processor on the device for execution by the processor if the diagnostic module requires a full operating system for execution; and
output the diagnostic information to the management module.

26. The article of claim 25, wherein obtaining comprises:
receiving the diagnostic information from the processor.

27. The article of claim 25, wherein the identification information is provided in response to a request from the management module.

28. The article of claim 25, wherein the identification information is provided automatically when the device is incorporated into the modular computing system.

* * * * *